United States Patent
Zhu (10) Patent No.: US 12,413,998 B2
(45) Date of Patent: Sep. 9, 2025

(54) MEASUREMENT FEEDBACK METHOD AND APPARATUS, NETWORK DEVICE, TERMINAL, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 397 days.

(21) Appl. No.: 18/014,134

(22) PCT Filed: Jul. 13, 2020

(86) PCT No.: PCT/CN2020/101677
§ 371 (c)(1),
(2) Date: Dec. 30, 2022

(87) PCT Pub. No.: WO2022/011507
PCT Pub. Date: Jan. 20, 2022

(65) Prior Publication Data
US 2023/0284059 A1    Sep. 7, 2023

(51) Int. Cl.
*H04W 24/10*    (2009.01)
*H04W 8/22*    (2009.01)
H04W 84/06    (2009.01)
H04W 92/10    (2009.01)

(52) U.S. Cl.
CPC ............ *H04W 24/10* (2013.01); *H04W 8/22* (2013.01); *H04W 84/06* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 2005/0153732 A1* | 7/2005 | Stotelmyer | H04W 88/06 455/552.1 |
| 2019/0229781 A1 | 7/2019 | Jin et al. | |
| 2019/0288751 A1 | 9/2019 | Jin et al. | |
| 2020/0112883 A1* | 4/2020 | Naik | H04L 47/125 |
| 2021/0037534 A1 | 2/2021 | Ji | |

(Continued)

FOREIGN PATENT DOCUMENTS

| | | |
|---|---|---|
| CN | 101888646 A | 11/2010 |
| CN | 110034884 A | 7/2019 |
| CN | 110380828 A | 10/2019 |

(Continued)

OTHER PUBLICATIONS

International Search Report of PCT/CN2020/101677 dated Apr. 9, 2021 with English translation, (4p).

(Continued)

*Primary Examiner* — Hassan A Phillips
*Assistant Examiner* — Gautam Sharma
(74) *Attorney, Agent, or Firm* — Arch & Lake LLP (57) ABSTRACT

A measurement feedback method includes: receiving, by a network device, capability information of a terminal and, in response to the capability information of the terminal, determining, by the network device, measurement feedback configuration information for the terminal; and sending, by the network device, the measurement feedback configuration information to the terminal.

18 Claims, 3 Drawing Sheets

(56) References Cited

U.S. PATENT DOCUMENTS

| 2021/0258898 A1* | 8/2021 | Ma | H04L 5/0053 |
| 2023/0284059 A1* | 9/2023 | Zhu | H04W 24/10 |
| | | | 370/329 |

FOREIGN PATENT DOCUMENTS

| WO | 2019013921 A1 | 1/2019 |
| WO | 2019170866 A1 | 9/2019 |
| WO | 2020091527 A1 | 5/2020 |

OTHER PUBLICATIONS

Search Report for EP application 20945391.9 dated Aug. 7, 2023, 19 pages.

* cited by examiner

MEASUREMENT FEEDBACK METHOD AND APPARATUS, NETWORK DEVICE, TERMINAL, AND STORAGE MEDIUM

CROSS-REFERENCE TO RELATED APPLICATION

The present application is a U. S. National Stage of International Application No. PCT/CN2020/101677, filed on Jul. 13, 2020, the entire content of which is incorporated by reference herein for all purposes.

BACKGROUND

For satellite communication systems, due to a long distance between a satellite and a terminal and a wide coverage of the satellite, the link quality between different terminals and the service satellite has strong consistency.

SUMMARY

The present disclosure relates to the field of measurement feedback configuration technologies for terminals, and more particularly, to a measurement feedback method and a measurement feedback apparatus, a network device, a terminal and a storage medium.

According to a first aspect of the present disclosure, a measurement feedback method, performed by a network device, is provided, including: receiving terminal capability information of a terminal residing at a satellite network node; determining measurement feedback configuration information for the terminal based on the terminal capability information; and sending the measurement feedback configuration information to the terminal.

According to a second aspect of the present disclosure, a measurement feedback method, performed by a terminal, is provided, including: receiving measurement feedback configuration information from a satellite network node where the terminal resides; and performing a measurement and reporting a measurement result based on the measurement feedback configuration information.

According to a third aspect of the present disclosure, a terminal is provided. The terminal includes a processor, a transceiver, a memory and an executable program stored on the memory and runnable by the processor. The processor is configured to receive measurement feedback configuration information from a satellite network node where the terminal resides; and perform a measurement and reporting a measurement result based on the measurement feedback configuration information.

BRIEF DESCRIPTION OF THE DRAWINGS

Accompanying drawings herein are incorporated into the specification and form a part of the specification, showing embodiments in accordance with the present disclosure, and are used together with the specification to explain principles of the present disclosure.

DETAILED DESCRIPTION

Illustrative embodiments will be described in detail, and examples of the embodiments will be shown in the drawings. When the following description relates to accompanying drawings, same numbers in different accompanying drawings represent same or similar elements unless otherwise indicated. The implementations described in the following illustrative embodiments do not represent all implementations consistent with embodiments of the present disclosure. Instead, they are only examples of apparatuses and methods consistent with some aspects of embodiments of the present disclosure as detailed in the appended claims.

Terms used in the present disclosure are only for the purpose of describing specific embodiments, and are not intended to limit the present disclosure. As used in embodiments of the present disclosure and the appended claims, "a/an," "said" and "the" in singular forms are also intended to include plural forms, unless otherwise clearly indicated in the context. It should also be understood that the term "and/or" used herein represents and includes any and all possible combinations of one or more associated listed items.

It should be understood that although terms such as "first," "second," and "third" may be used to describe various kinds of information in the present disclosure, such information shall not be limited by these terms. These terms are only used to distinguish information of the same type from each other. For example, without departing from the scope of the present disclosure, the first information may further be referred to as the second information, and similarly, the second information may further be referred to as the first information. Depending on the context, the term "if" used here may be interpreted as "when" or "upon" or "in response to determining."

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

For satellite communication systems, due to a long distance between a satellite and a terminal and a wide coverage of the satellite, the link quality between different terminals and the service satellite has strong consistency. In this case, if a measurement feedback mechanism of a cellular communication is still used, many terminals will make a lot of useless measurements, waste a lot of communication resources and consume more power, which is not beneficial to improvement of the communication quality.

Figure 1:
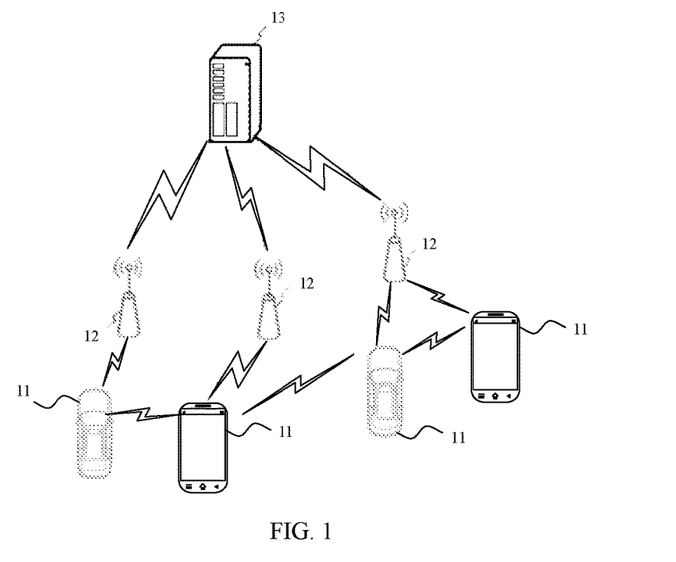
FIG. 1 is a schematic view of a wireless communication system shown according to an illustrative embodiment.

Referring to FIG. 1, FIG. 1 shows a schematic view of a wireless communication system according to embodiments of the present disclosure. As shown in FIG. 1, the wireless communication system is a communication system based on a cellular mobile communication technology and may include several terminals 11 and several base stations 12.

The terminal 11 may be a device for providing voice and/or data connectivity to a user. The terminal 11 may be in communication with one or more core networks via a Radio Access Network (RAN). The terminal 11 may be an Internet of Things terminal, such as a sensor device, a mobile phone (or referred to as a "cellular" phone) and a computer with the Internet of Things terminal. For example, the terminal 11 may be a fixed, portable, pocket, handheld, computer built-in or on-board apparatus. For example, the terminal 11 may be a Station (STA), a subscriber unit, a subscriber station, a mobile station, a mobile, a remote station, an access point, a remote terminal, an access terminal, a user terminal, a user agent, a user device or user equipment (UE). Or, the terminal 11 may also be an unmanned aerial vehicle. Or, the terminal 11 may further be an on-board device, such as an on-board computer with a wireless communication function, or a wireless communication device coupled to the on-board computer externally. Or, the terminal 11 may further be a roadside device, such as a street lamp, a signal lamp or other roadside devices with the wireless communication function.

The base station 12 may be a network-side device in the wireless communication system. The wireless communication system may be a 4th generation mobile communication (4G) system, also referred to as a Long Term Evolution (LTE) system. Or, the wireless communication system may further be a 5G system, also referred to as a new radio (NR) system or a 5G NR system. Or, the wireless communication system may further be a next generation of the 5G system. An access network in the 5G system may be referred to as a New Generation-Radio Access Network (NG-RAN), or an MTC-system.

The base station 12 may be an evolved Node B (eNB) adopted in the 4G system. Or, the base station 12 may further be a base station adopting a centralized and distributed architecture in the 5G system (gNB). When adopting the centralized and distributed architecture, the base station 12 usually includes a Central Unit (CU) and at least two Distributed Units (DU). The central unit includes a protocol stack of a Packet Data Convergence Protocol (PDCP) layer, a Radio Link Control (RLC) layer, and a Medium Access Control (MAC) layer. The distributed unit includes a protocol stack of a Physical (PHY) layer. The specific implementation of the base station 12 is not limited in embodiments of the present disclosure.

A wireless coupling may be established between the base station 12 and the terminal 11 through a wireless air interface. In different implementations, the wireless air interface is a wireless air interface based on a standard of the 4th generation mobile communication network technology (4G). Or, the wireless air interface is a wireless air interface based on a standard of the 5th generation mobile communication network technology (5G), for example, the wireless air interface is a new radio. Or, the wireless air interface may further be a wireless air interface based on a standard of a next generation mobile communication network technology of the 5G.

In some embodiments, an E2E (End to End) coupling may further be established between the terminals 11, such as a V2V (vehicle to vehicle) communication, a V2I (vehicle to Infrastructure) communication and a V2P (vehicle to Pedestrian) communication in a V2X (vehicle to everything) communication.

In some embodiments, the above wireless communication system may further include a network management device 13.

Several base stations 12 are coupled to the network management device 13 respectively. The network management device 13 may be a core network device in the wireless communication system, for example, the network management device 13 may be a Mobility Management Entity (MME) in an Evolved Packet Core (EPC). Or, the network management device may further be other core network devices, such as a Service GateWay (SGW), a Public Data Network GateWay (PGW), a Policy and Charging Rules Function (PCRF) or a Home Subscriber Server (HSS). The implementation form of the network management device 13 is not limited in embodiments of the present disclosure.

An executing body involved in embodiments of the present disclosure includes, but is not limited to, the user equipment (UE) in a cellular mobile communication system, the base station of the cellular mobile communication, etc.

Figure 2:
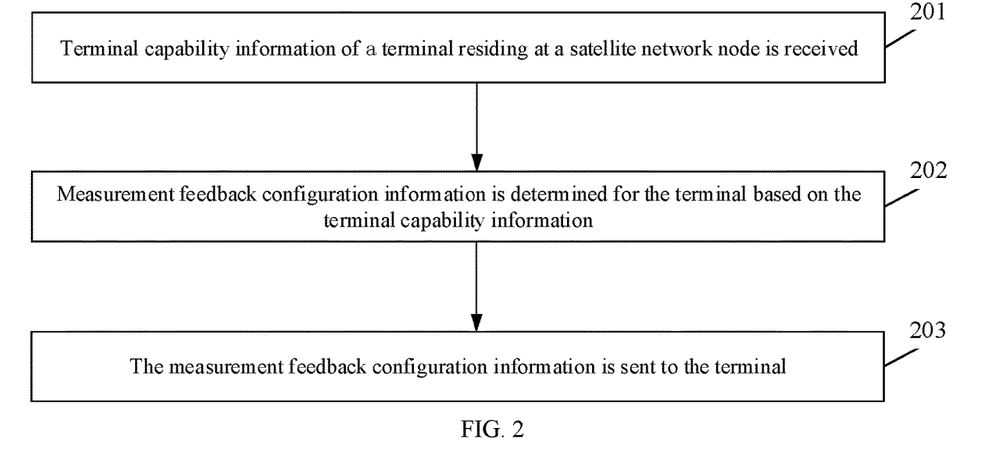
FIG. 2 is a flow diagram of a measurement feedback method shown according to an illustrative embodiment.

FIG. 2 is a flow diagram of a measurement feedback method shown according to an illustrative embodiment. As shown in FIG. 2, the measurement feedback method of embodiments of the present disclosure includes following processing steps.

At Step 201, terminal capability information of a terminal residing at a satellite network node is received.

In embodiments of the present disclosure, the satellite network node may be a service satellite providing communication service access for the terminal, i.e., a communication satellite where the terminal currently resides. The terminal may access a mobile communication network through the communication satellite to realize calling, the short message, the internet access and other services.

The satellite network node needs to determine a corresponding measurement feedback configuration for the terminal based on the terminal capability information. Different terminals correspond to different measurement feedback. As an example, for ordinary communication terminals, the satellite network node is configured such that the terminals do not perform any measurement feedback operations. Therefore, these terminals do not need to perform the operation of the measurement feedback. For some terminals with strong capabilities, such as dedicated satellite transceiver terminals, only these satellite transceiver terminals may be configured to perform the operation of the measurement feedback.

In embodiments of the present disclosure, the terminal capability information includes at least one of the following information: a form of the terminal, battery power information of the terminal, transmitting power information of the terminal, antenna configuration information of the terminal and a processing capacity of the terminal; or the terminal capability information includes link quality information of the terminal.

At step 202, measurement feedback configuration information is determined for the terminal based on the terminal capability information.

After receiving the terminal capability information, the satellite network node determines the corresponding measurement feedback configuration information for the terminal according to the specific capability of the terminal.

In embodiments of the present disclosure, the measurement feedback configuration information includes: the terminal does not perform any measurement and does not feed back a measurement result; or the terminal measures a configured measuring quantity and feeds back the measurement result; or the terminal measures the configured measuring quantity and feeds back the measurement result in a configuration period; or the terminal measures the configured measuring quantity on a configured resource and feeds back the measurement result; or the terminal measures the configured measuring quantity on a configured first resource and feeds back the measurement result on a configured second resource.

At step 203, the measurement feedback configuration information is sent to the terminal.

After determining the corresponding measurement feedback configuration information for the terminal, the satellite network node sends the corresponding measurement feedback configuration information to the terminal, such that the terminal executes the corresponding measurement feedback based on the measurement feedback configuration information.

In embodiments of the present disclosure, the satellite network node may receive the terminal capability information associated with the terminal and reported by the terminal through an air interface link between the satellite network node and the terminal.

As an implementation manner, the satellite network node receives the terminal capability information associated with the terminal and reported by a satellite ground station. That is to say, in embodiments of the present disclosure, some satellite ground stations specially configured for the measurement feedback may further be deployed. These satellite ground stations may be responsible for collecting the capability conditions or the link conditions of peripheral terminals that need to access the satellite communication system, and then feed the capability conditions or the link conditions back to the satellite network nodes.

In an implementation manner, the terminal capability information associated with the terminal may further include terminal capability information of other terminals besides the terminal. That is to say, the terminal may not only report its own terminal capability information, but also collect the terminal capability information of other terminals, and report its own terminal capability information and the terminal capability information of other terminals to the satellite network node together, thus generally reducing unnecessary signaling and power consumption in a satellite service cell.

Correspondingly, the satellite network node sends the measurement feedback configuration information to the terminal through the air interface link between the satellite network node and the terminal; or sends the measurement feedback configuration information to the terminal through the satellite ground station.

In embodiments of the present disclosure, a measurement feedback mechanism based on a terminal group may further be defined. The satellite network node sends the measurement feedback configuration information to the terminal through downlink information. The downlink information further at least includes a terminal identification group or a single terminal identification, and the terminal identification group includes identification information of the terminal. Alternatively or additionally, the satellite network node loads the downlink information in a public broadcast message and sends the measurement feedback configuration information to the terminal. For example, the satellite network node loads the downlink information in a Broadcast Control Channel (BCCH) and sends the measurement feedback configuration information to the terminal through the BCCH. Or, as an implementation manner, the downlink information is loaded in a PDCCH, and the measurement feedback configuration information is sent to the terminal through the PDCCH.

Alternatively or additionally, the satellite network node triggers a group of terminals to perform the operation of measurement feedback by sending a common control information. For example, when the air interface technology employs 5G, a Downlink Control Information (DCI) carrying the common control information may be defined. The DCI is configured to trigger the group of terminals to perform the operation of measurement feedback. For example, an DCI information domain or a Physical Downlink Shared Channel (PDSCH) dispatched by the DCI may contain instruction information of an ID of the terminal that needs to perform a measurement report. Or, the DCI may also directly contain the instruction information of the ID of the terminal that needs to perform the measurement report. The target terminal receiving the instruction performs the operation of measurement or/and feedback according to the instruction. As an example, for all terminals residing at the satellite network node, all dedicated satellite transceiver terminals are selected as the terminal group reporting the measurement feedback, such that the dedicated satellite transceiver terminals residing at the satellite network node measure the link quality, and report the measurement result to the satellite network node. Or, a predetermined number of the terminals with more than 90% of the terminal power residing at the satellite network node are selected as the terminal group reporting the measurement feedback, such that the terminal group measures the link quality, and reports the measurement result to the satellite network node.

In embodiments of the present disclosure, the terminal configured to measure the link quality measures the link quality such as a signal-to-noise ratio, a packet error rate and the number of successfully received messages, and feeds the link quality back to the satellite network node.

Or, as an implementation manner, the satellite network node sends the measurement feedback configuration information to the satellite ground station, such that the satellite ground station determines a communication mode with a terminal to be configured based on the measurement feedback configuration information, and the configuration of the measurement feedback to the terminal is completed based on the communication mode. For example, based on the link quality condition fed back by the terminal in conjunction with the terminal capability information, the satellite network node selects an appropriate mode to transmit the measurement feedback configuration information for each terminal, and sends the measurement feedback configuration information to the terminal according to the determined communication mode, such that the terminal may perform its own measurement feedback configuration based on the measurement feedback configuration information. After the corresponding measurement is performed, the measurement feedback is carried out according to the configured measurement feedback mode.

Figure 3:
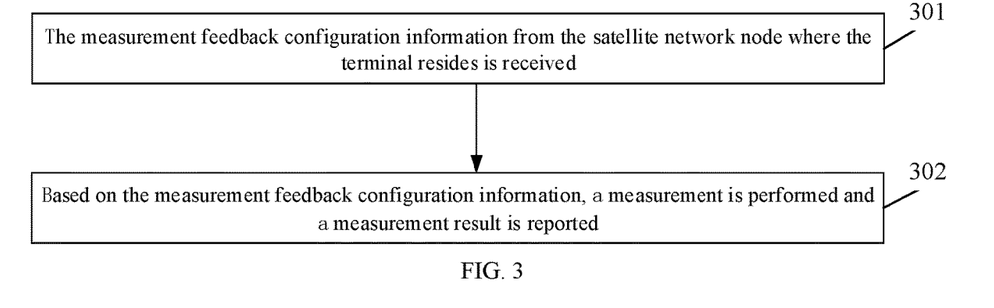
FIG. 3 is a flow diagram of a measurement feedback method shown according to an illustrative embodiment.

FIG. 3 is a flow diagram of a measurement feedback method shown according to an illustrative embodiment. As shown in FIG. 3, the measurement feedback method according to embodiments of the present disclosure includes the following processing steps.

At step 301, the measurement feedback configuration information from the satellite network node where the terminal resides is received.

Alternatively or additionally, the terminal receives the measurement feedback configuration information from the satellite network node through the air interface link between the satellite network node and the terminal; or the terminal receives the measurement feedback configuration information from the satellite network node through the satellite ground station.

Or, as an implementation, the terminal receives a common measurement feedback configuration information, and the common measurement feedback configuration information indicates the measurement feedback configuration for the terminal group including the terminal. Alternatively or additionally, the satellite network node loads the common measurement feedback configuration information in the public broadcast message and sends the common measurement feedback configuration information to the terminal. For example, the satellite network node loads the common measurement feedback configuration information in the Broadcast Control Channel (BCCH) and sends the common measurement feedback configuration information to the terminal through the BCCH. After receiving the common measurement feedback configuration information, the terminal determines whether it instructs itself to perform the link quality measurement and report the corresponding measurement result to the satellite network node according to the terminal identification information carried in the common measurement feedback configuration information.

In embodiments of the present disclosure, the satellite network node may be a service satellite providing the communication service access for the terminal, i.e., a communication satellite where the terminal currently resides. The terminal may access the mobile communication network through the communication satellite to realize the calling, the short message, the internet access and other services.

In embodiments of the present disclosure, before the step 301 is performed, the terminal reports the terminal capability information associated with the terminal to the satellite network node. Alternatively or additionally, the terminal reports the terminal capability information associated with the terminal to the satellite network node through the air interface link between the satellite network node and the terminal.

As an implementation manner, the terminal capability information associated with the terminal is reported to the satellite network node through the satellite ground station. For example, after establishing a communication link with the terminal, the satellite ground station sends a request for obtaining the terminal capability information to the terminal, and the terminal reports the terminal capability information to the satellite ground station. Therefore, the satellite network node configures the terminal with the corresponding measurement feedback configuration information based on the terminal capability information, and the terminal performs a corresponding measurement report according to the measurement feedback configuration.

In an implementation manner, the terminal capability information associated with the terminal further includes terminal capability information of other terminals besides the terminal. That is to say, the terminal may not only report its own terminal capability information, but also collect the terminal capability information of other terminals, and report its own terminal capability information and the terminal capability information of other terminals to the satellite network node together, thus generally reducing unnecessary signaling and power consumption in the satellite service cell.

In embodiments of the present disclosure, the terminal capability information includes at least one of the following information: the form of the terminal, the battery power information of the terminal, the transmitting power information of the terminal, the antenna configuration information of the terminal and the processing capacity of the terminal; or the terminal capability information includes the link quality information of the terminal.

In embodiments of the present disclosure, the measurement feedback configuration information includes: the terminal does not perform any measurement and does not feed back a measurement result; or the terminal measures a configured measuring quantity and feeds back the measurement result; or the terminal measures the configured measuring quantity and feeds back the measurement result in a configuration period; or the terminal measures the configured measuring quantity on a configured resource and feeds back the measurement result; or the terminal measures the configured measuring quantity on a configured first resource and feeds back the measurement result on a configured second resource.

At step 302, based on the measurement feedback configuration information, the measurement is performed and the measurement result is reported.

In embodiments of the present disclosure, the terminal configured to perform the measurement feedback of the link quality measures the current link quality, such as the signal-to-noise ratio, the packet error rate, the number of successfully received messages and other parameters, and reports the measuring quantity according to a measurement feedback period or other factors, that is, the terminal reports the measured measurement result to the satellite network node. Or, after receiving a reporting instruction of the measurement result of the satellite network node, the terminal reports the measured measurement result to the satellite network node.

The present disclosure further discloses a method for reporting a terminal capability. The terminal residing at the satellite network node may collect the terminal capability information of other terminals in the satellite service cell. The collection operation may be performed in response to a request of the satellite network node or the satellite ground station, or the terminal may be designated to perform the collection operation periodically. After collecting enough terminal capability information (for example, within a certain distance, a certain amount of terminal capability information and/or within a certain time), the terminal sends the collected terminal capability information to the satellite network node or the satellite ground station, such that the satellite network node or the satellite ground station obtains the terminal capability information. The satellite network node or the satellite ground station may obtain the terminal capability information, and may determine a communication parameter (such as the measurement feedback configuration information, a switching parameter, etc.) for the corresponding terminal based on the terminal capability information. Moreover, the satellite network node or the satellite ground station notifies the corresponding terminal by the signaling. According to the received communication parameter, the terminal may perform a corresponding communication operation, such as measuring and reporting.

The present disclosure further discloses a method for reporting the terminal capability. After establishing the communication link with the terminal, the satellite ground station may send a request for obtaining the terminal capability information to the terminal. In response to the request, the terminal may report the terminal capability information to the satellite ground station. The capability information may then be sent by the satellite ground station to the satellite network node through the air interface resource, such that the satellite network node may configure the corresponding communication parameter (such as the measurement feedback configuration information, the switching parameter, etc.) for the terminal based on the terminal capability information, and notify the corresponding terminal by the signaling. According to the received communication parameter, the terminal may perform the corresponding communication operation, such as measuring and reporting.

Figure 4:
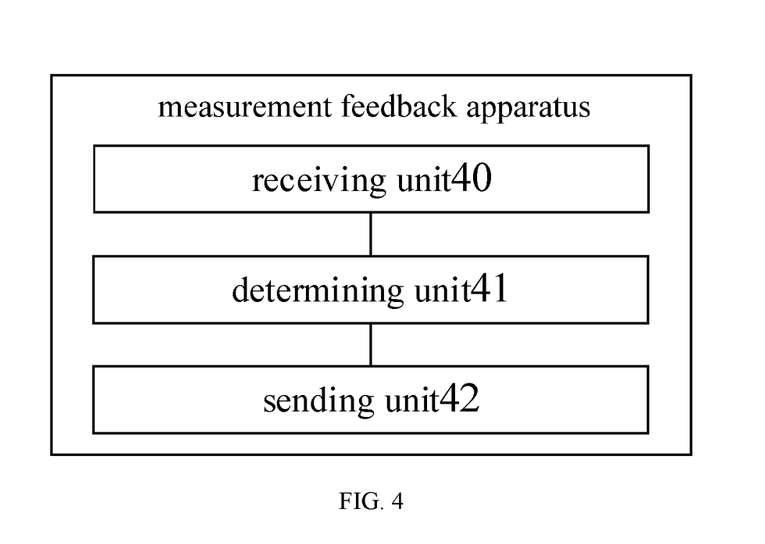
FIG. 4 is a schematic view of components of a measurement feedback apparatus shown according to an illustrative embodiment.

FIG. 4 is a schematic view of components of a measurement feedback apparatus shown according to an illustrative embodiment. As shown in FIG. 4, the measurement feedback apparatus according to embodiments of the present disclosure includes: a receiving unit 40 configured to receive the terminal capability information of the terminal residing at the satellite network node; a determining unit 41 configured to determine measurement feedback configuration information for the terminal based on the terminal capability information; and a sending unit 42 configured to send the measurement feedback configuration information to the terminal.

In an embodiment, the receiving unit 40 is further configured to: receive the terminal capability information associated with the terminal and reported by the terminal through the air interface link between the satellite network node and the terminal; or receive the terminal capability information associated with the terminal and reported by the satellite ground station.

In an embodiment, the terminal capability information associated with the terminal further includes terminal capability information of other terminals besides the terminal. That is to say, the terminal may not only report its own terminal capability information, but also collect the terminal capability information of other terminals, and report its own terminal capability information and the terminal capability information of other terminals to the satellite network node together, thus generally reducing unnecessary signaling and power consumption in the satellite service cell.

In an embodiment, the sending unit 42 is further configured to: send the measurement feedback configuration information to the terminal through the air interface link between the satellite network node and the terminal; or send the measurement feedback configuration information to the terminal through the satellite ground station.

In an embodiment, the sending unit 42 is further configured to: send the common measurement feedback configuration information, the common measurement feedback configuration information indicating the measurement feedback configuration for the terminal group including the terminal.

In an embodiment, the sending unit 42 is further configured to: send the measurement feedback configuration information to the satellite ground station, such that the satellite ground station determines the communication mode with the terminal to be configured based on the measurement feedback configuration information, and the configuration of the measurement feedback to the terminal is completed based on the communication mode.

In an embodiment, the measurement feedback configuration information includes: the terminal does not perform any measurement and does not feed back a measurement result; or the terminal measures a configured measuring quantity and feeds back the measurement result; or the terminal measures the configured measuring quantity and feeds back the measurement result in a configuration period; or the terminal measures the configured measuring quantity on a configured resource and feeds back the measurement result; or the terminal measures the configured measuring quantity on a configured first resource and feeds back the measurement result on a configured second resource.

In an embodiment, the terminal capability information includes at least one of the following information: the form of the terminal, the battery power information of the terminal, the transmitting power information of the terminal, the antenna configuration information of the terminal and the processing capacity of the terminal; or, the terminal capability information includes the link quality information of the terminal.

In an illustrative embodiment, the receiving unit 40, the determining unit 41 and the sending unit 42 may be implemented by one or more of a Central Processing Unit (CPU), a Graphics Processing Unit (GPU), a base processor (BP), an Application Specific Integrated Circuit (ASIC), a DSP, a Programmable Logic Device (PLD), a Complex Programmable Logic Device (CPLD), a Field-Programmable Gate Array (FPGA), a general processor, a controller, a Micro Controller Unit (MCU), a Microprocessor, or other electronic elements, or may be implemented by combining one or more radio frequency (RF) antennas, to perform a step of the method for collecting network data of the above embodiments.

In embodiments of the present disclosure, a specific mode of respective units in the measurement feedback apparatus shown in FIG. 4 to perform the operation has been described in detail in the embodiments related to the method, and will not be described in detail here.

Figure 5:
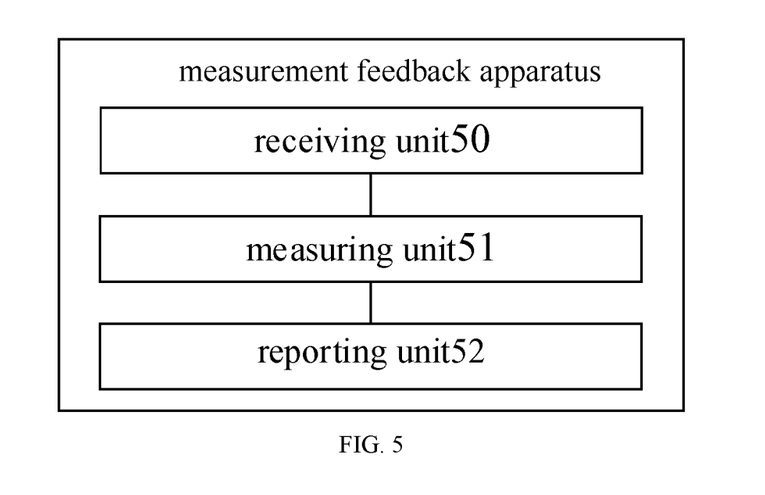
FIG. 5 is a schematic view of components of a measurement feedback apparatus shown according to an illustrative embodiment.

FIG. 5 is a schematic view of components of a measurement feedback apparatus shown according to an illustrative embodiment. As shown in FIG. 5, the measurement feedback apparatus according to embodiments of the present disclosure includes: a receiving unit 50 configured to receive the measurement feedback configuration information from the satellite network node where the terminal resides; a measuring unit 51 configured to perform a measurement based on the measurement feedback configuration information; and a reporting unit 52 configured to report the measurement result of the measuring unit.

In an embodiment, the receiving unit 50 is further configured to: receive the measurement feedback configuration information from the satellite network node through the air interface link between the satellite network node and the terminal; or receive the measurement feedback configuration information from the satellite network node through the satellite ground station.

In an embodiment, the receiving unit 50 is further configured to: receive the common measurement feedback configuration information, the common measurement feedback configuration information indicating the measurement feedback configuration for the terminal group including the terminal.

In an embodiment, the reporting unit 52 is further configured to: report the terminal capability information associated with the terminal to the satellite network node through the air interface link between the satellite network node and the terminal; or report the terminal capability information associated with the terminal to the satellite network node through the satellite ground station.

In an embodiment, the terminal capability information associated with the terminal further includes terminal capability information of other terminals besides the terminal. That is to say, the terminal may not only report its own terminal capability information, but also collect the terminal capability information of other terminals, and report its own terminal capability information and the terminal capability information of other terminals to the satellite network node together, thus generally reducing unnecessary signaling and power consumption in the satellite service cell.

In an embodiment, the terminal capability information includes at least one of the following information: the form of the terminal, the battery power information of the terminal, the transmitting power information of the terminal, the antenna configuration information of the terminal and the processing capacity of the terminal; or, the terminal capability information includes the link quality information of the terminal.

In an embodiment, the measurement feedback configuration information includes: the terminal does not perform any measurement and does not feed back a measurement result; or the terminal measures a configured measuring quantity and feeds back the measurement result; or the terminal measures the configured measuring quantity and feeds back the measurement result in a configuration period; or the terminal measures the configured measuring quantity on a configured resource and feeds back the measurement result; or the terminal measures the configured measuring quantity on a configured first resource and feeds back the measurement result on a configured second resource.

In an illustrative embodiment, the receiving unit 50, the measuring unit 51 and the reporting unit 52 may be implemented by one or more of a Central Processing Unit (CPU), a Graphics Processing Unit (GPU), a base processor (BP), an Application Specific Integrated Circuit (ASIC), a DSP, a Programmable Logic Device (PLD), a Complex Programmable Logic Device (CPLD), a Field-Programmable Gate Array (FPGA), a general processor, a controller, a Micro Controller Unit (MCU), a Microprocessor, or other electronic elements, or may be implemented by combining one or more radio frequency (RF) antennas, to perform a step of the method for collecting network data of the above embodiments.

In embodiments of the present disclosure, a specific mode of respective units in the measurement feedback apparatus shown in FIG. 5 to perform the operation has been described in detail in the embodiments related to the method, and will not be described in detail here.

Figure 6:
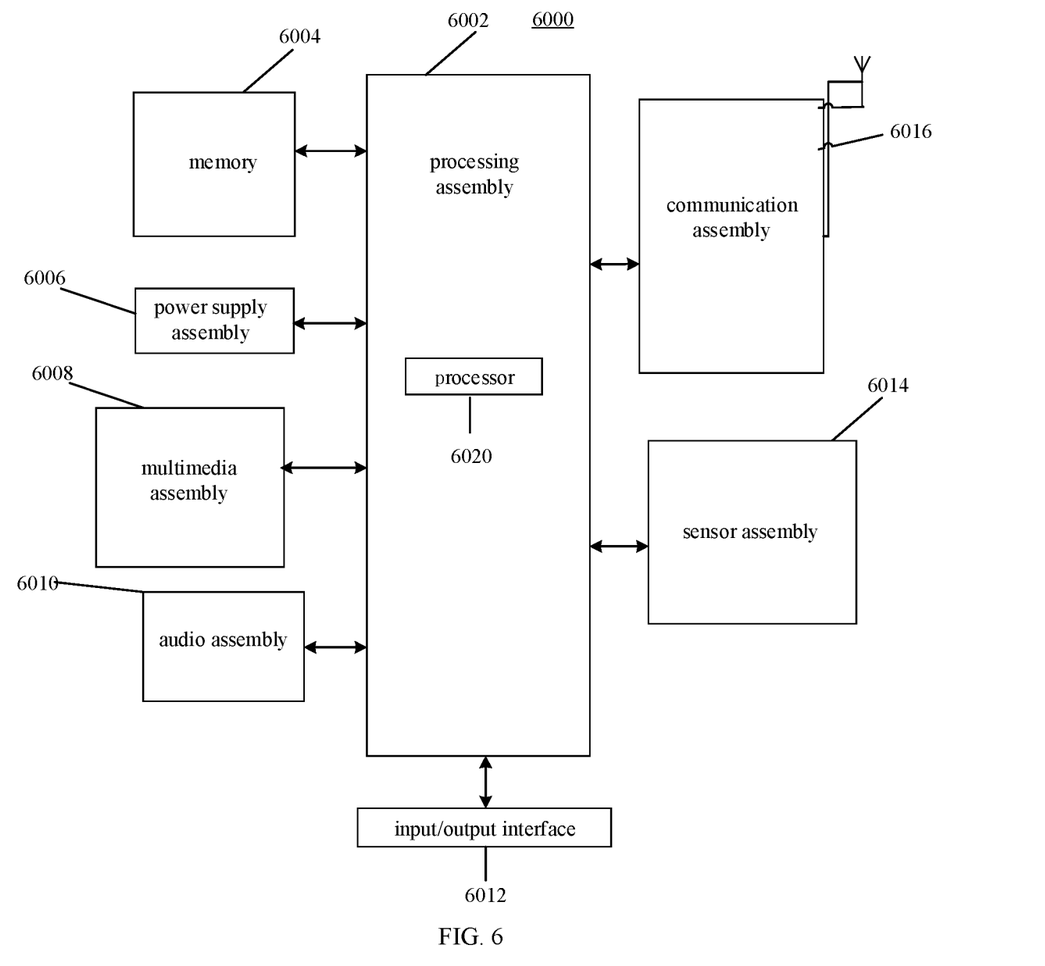
FIG. 6 is a schematic view of components of user equipment shown according to an illustrative embodiment.

FIG. 6 is a block diagram of user equipment 6000 shown according to an illustrative embodiment. For example, the user equipment 6000 may be a mobile phone, a computer, a digital broadcasting terminal, a messaging device, a game console, a tablet device, a medical device, a fitness device, a personal digital assistant, and the like.

Referring to FIG. 6, the user equipment 6000 may include one or more of the following assemblies: a processing assembly 6002, a memory 6004, a power supply assembly 6006, a multimedia assembly 6008, an audio assembly 6010, an input/output (I/O) interface 6012, a sensor assembly 6014 and a communication assembly 6016.

The processing assembly 6002 typically controls the overall operation of the user equipment 6000, such as operations associated with the display, the telephone call, the data communication, the camera operation and the recording operation. The processing assembly 6002 may include one or more processors 6020 to execute an instruction, to complete all or part of the above method steps. In addition, the processing assembly 6002 may include one or more modules, to facilitate the interaction between the processing assembly 6002 and other assemblies. For example, the processing assembly 6002 may include a multimedia module, to facilitate the interaction between the multimedia assembly 6008 and the processing assembly 6002.

The memory 6004 is configured to store various types of data, to support the operation at the equipment 6000. Examples of such data include an instruction, contact data, phone book data, a message, a picture, a video, and the like of any application or method configured to operate on the user equipment 6000. The memory 6004 may be realized by any type of volatile or non-volatile storage device or combination thereof, such as a static random access memory (SRAM), an electrically erasable programmable read-only memory (EEPROM), an erasable programmable read-only memory (EPROM), a programmable read only memory (PROM), a read-only memory (ROM), a magnetic memory, a flash memory, a magnetic disk or an optical disk.

The power supply assembly 6006 provides power for various assemblies of the user equipment 6000. The power supply assembly 6006 may include a power management system, one or more power supplies, and other assemblies associated with generating, managing, and distributing power for the user equipment 6000.

The multimedia assembly 6008 includes a screen configured to provide an output interface between the user equipment 6000 and the user. In some embodiments, the screen may include a liquid crystal display (LCD) and a touch panel (TP). If the screen includes the touch panel, the screen may be implemented as a touch screen, to receive an input signal from the user. The touch panel includes one or more touch sensors, to sense a touch, a sliding, and a gesture on the touch panel. The touch sensor may not only sense a boundary of a touch or slide action, but also detect a duration and a pressure associated with the touch or slide operation. In some embodiments, the multimedia assembly 6008 includes a front camera and/or a rear camera. When the equipment 6000 is in an operation mode, such as a shooting mode or a video mode, the front camera and/or the rear camera may receive external multimedia data. Each of the front camera and the rear camera may be a fixed optical lens system or has a focal length and the optical zoom capability.

The audio assembly 6010 is configured to output and/or input an audio signal. For example, the audio assembly 6010 includes a microphone (MIC), and the microphone is configured to receive the external audio signal when the user equipment 6000 is in an operation mode, such as a call mode, a recording mode, and a voice recognition mode. The received audio signal may be further stored in the memory 6004 or transmitted via the communication assembly 6016. In some embodiments, the audio assembly 6010 further includes a speaker configured to output the audio signal.

The I/O interface 6012 provides an interface between the processing assembly 6002 and a peripheral interface module, and the peripheral interface module may be a keyboard, a click wheel, a button, etc. The button may include but is not limited to a Home button, a Volume button, a Start button, and a Lock button.

The sensor assembly 6014 includes one or more sensors configured to provide the user equipment 6000 with various aspects of status evaluation. For example, the sensor assembly 6014 may detect an on/off state of the equipment 6000, and the relative positioning of assemblies such as a display and a keypad of the user equipment 6000. The sensor assembly 6014 may further detect the location change of the user equipment 6000 or of an assembly of the user equipment 6000, the presence or absence of the contact between the user and the user equipment 6000, the orientation or acceleration/deceleration of the user equipment 6000 and the temperature change of the user equipment 6000. The sensor assembly 6014 may include a proximity sensor configured to detect the presence of a nearby object without any physical contact. The sensor assembly 6014 may further include a light sensor, such as a CMOS image sensor or a CCD image sensor, for use in an imaging application. In some embodiments, the sensor assembly 6014 may further include an acceleration sensor, a gyroscope sensor, a magnetic sensor, a pressure sensor or a temperature sensor.

The communication assembly 6016 is configured to facilitate the wired or wireless communication between the user equipment 6000 and other devices. The user equipment 6000 may access a wireless network based on a communication standard, such as a WiFi, a 2G or a 3G, or a combination thereof. In an illustrative embodiment, the communication assembly 6016 receives a broadcast signal or broadcast related information from an external broadcast management system via a broadcast channel. In an illustrative embodiment, the communication assembly 6016 further includes a near field communication (NFC) module to facilitate the short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an illustrative embodiment, the user equipment 6000 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor or other electronic elements, to perform a step of the measurement feedback method and the method for reporting the terminal capability of the above embodiments.

In an illustrative embodiment, a non-transitory computer-readable storage medium including an instruction is further provided, such as the memory 6004 including an instruction, and the above instruction may be executed by the processor 6020 of the user equipment 6000, to complete the above measurement feedback method and the above method for reporting the terminal capability. For example, the non-transitory computer-readable storage medium may be a ROM, a random access memory (RAM), a CD-ROM, a tape, a floppy disk, an optical data storage device, etc.

In an illustrative embodiment, the present disclosure further discloses a network device, and the network device includes a processor, a transceiver, a memory and an executable program stored on the memory and runnable by the processor. The processor executes a step of the measurement feedback method or of the method for reporting the terminal capability when running the executable program. In embodiments of the present disclosure, the network device includes a communication satellite or a satellite ground station and other devices.

In an illustrative embodiment, the present disclosure further discloses a terminal, and the terminal includes a processor, a transceiver, a memory, and an executable program stored on the memory and runnable by the processor. The processor executes a step of the measurement feedback method or of the method for reporting the terminal capability when running the executable program. The terminal may be a satellite communication terminal or a terminal that can access a mobile communication network. The terminal may access a communication satellite through a satellite ground station or a base station.

Other implementations of the present disclosure will be apparent to those skilled in the art from consideration of the specification and practice of the present disclosure. The present disclosure is intended to cover any change, use or adaptation of the present disclosure, which complies with the general principles of embodiments of the present disclosure and includes common knowledge or conventional technical means in the art that are not disclosed herein. The specification and embodiments are considered to be merely illustrative, and the true scope and spirit of the present disclosure are indicated by the following claims.

It should be understood that embodiments of the present disclosure are not limited to the specific structures described above and shown in the accompanying drawings, and various of combinations, alternatives, modifications and changes may be made to steps of the method or assemblies of the device disclosed in the present disclosure without departing from the scope of the present disclosure, which are deemed to be included in the scope recorded by the patent application. The scope protected by the present disclosure is limited by the appended claims.

What is claimed is:

1. A measurement feedback method, comprising:
    receiving, by a network device, terminal capability information of a terminal residing at a satellite network node;
    determining, by the network device, measurement feedback configuration information for the terminal based on the terminal capability information; and
    sending, by the network device, the measurement feedback configuration information to the terminal,
    wherein sending the measurement feedback configuration information to the terminal, comprises:
    sending common measurement feedback configuration information, the common measurement feedback configuration information indicating a measurement feedback configuration for a terminal group comprising the terminal.

2. The method according to claim 1, wherein receiving terminal capability information of a terminal residing at the satellite network node, comprises at least one of:
    receiving the terminal capability information associated with the terminal and reported by the terminal through an air interface link between the satellite network node and the terminal; or
    receiving the terminal capability information associated with the terminal and reported by a satellite ground station.

3. The method according to claim 2, wherein the terminal capability information associated with the terminal further comprises terminal capability information of other terminals besides the terminal.

4. The method according to claim 1, wherein sending the measurement feedback configuration information to the terminal, comprises at least one of:
    sending the measurement feedback configuration information to the terminal through the air interface link between the satellite network node and the terminal; or
    sending the measurement feedback configuration information to the terminal through a satellite ground station.

5. The method according to claim 1, wherein sending the measurement feedback configuration information to the terminal, comprises:
    sending the measurement feedback configuration information to a satellite ground station, such that the satellite ground station determines a communication mode with the terminal to be configured based on the measurement feedback configuration information, and configuration of the measurement feedback to the terminal is completed based on the communication mode.

6. The method according to claim 1, wherein the measurement feedback configuration information comprises:

the terminal does not perform any measurement and does not feed back a measurement result; or the terminal measures a configured measuring quantity and feeds back the measurement result; or the terminal measures the configured measuring quantity and feeds back the measurement result in a configuration period; or the terminal measures the configured measuring quantity on a configured resource and feeds back the measurement result; or the terminal measures the configured measuring quantity on a configured first resource and feeds back the measurement result on a configured second resource.

7. The method according to claim 1, wherein the terminal capability information comprises at least one of following information:

a form of the terminal, battery power information of the terminal, transmitting power information of the terminal, antenna configuration information of the terminal and a processing capacity of the terminal.

8. A network device, comprising:
a processor;
a transceiver;
a memory; and
an executable program stored on the memory and runnable by the processor,
wherein the processor is configured to execute a measurement feedback method according to claim 1.

9. A non-transitory storage medium having an executable program stored thereon, wherein the executable program is configured to cause a processor to implement a measurement feedback method according to claim 1.

10. The method according to claim 1, wherein the terminal capability information comprises link quality information of the terminal.

11. A measurement feedback method, comprising:
receiving, by a terminal, measurement feedback configuration information from a satellite network node where the terminal resides; and
performing, by the terminal, a measurement and reporting a measurement result based on the measurement feedback configuration information,
wherein receiving measurement feedback configuration information from the satellite network node where a terminal resides, comprises:
receiving common measurement feedback configuration information, the common measurement feedback configuration information indicating a measurement feedback configuration for a terminal group comprising the terminal.

12. The method according to claim 11, further comprising:
reporting terminal capability information associated with the terminal to the satellite network node.

13. The method according to claim 11, wherein receiving measurement feedback configuration information from the satellite network node where a terminal resides, comprises at least one of:
receiving the measurement feedback configuration information from the satellite network node through an air interface link between the satellite network node and the terminal; or
receiving the measurement feedback configuration information from the satellite network node through a satellite ground station.

14. The method according to claim 12, further comprising at least one of:
reporting the terminal capability information associated with the terminal to the satellite network node through the air interface link between the satellite network node and the terminal; or
reporting the terminal capability information associated with the terminal to the satellite network node through a satellite ground station.

15. The method according to claim 14, wherein the terminal capability information associated with the terminal further comprises terminal capability information of other terminals besides the terminal.

16. The method according to claim 12, wherein the terminal capability information comprises at least one of following information:
a form of the terminal, battery power information of the terminal, transmitting power information of the terminal, antenna configuration information of the terminal and a processing capacity of the terminal.

17. The method according to claim 12, wherein the terminal capability information comprises link quality information of the terminal.

18. A terminal, comprising:
a processor;
a transceiver; a memory; and
an executable program stored on the memory and runnable by the processor,
wherein the processor is configured to:
receive measurement feedback configuration information from a satellite network node where a terminal resides; and
perform a measurement and reporting a measurement result based on the measurement feedback configuration information,
wherein the processor is configured to receive measurement feedback configuration information from the satellite network node where a terminal resides comprises:
the processor is configured to receive common measurement feedback configuration information, the common measurement feedback configuration information indicating a measurement feedback configuration for a terminal group comprising the terminal.

* * * * *